[15] 3,635,742
[45] Jan. 18, 1972

[54] CALCINING ALKALINE EARTH METAL CHLORIDES WITH CELLULOSE AND ADMIXING WITH PORTLAND CEMENT

[72] Inventor: Jiro Fujimasu, Tokyo, Japan
[73] Assignee: Fujimasu Industries International
[22] Filed: Aug. 14, 1969
[21] Appl. No.: 850,219

[52] U.S. Cl. .................................106/287, 61/36, 106/92, 106/315
[51] Int. Cl. .......................................C04b 13/22
[58] Field of Search ............106/287 SS, 315, 92, 93, 118, 106/120, 287, 314; 61/36

[56] References Cited

UNITED STATES PATENTS 1,422,337  7/1922  Catlett...................................106/315

*Primary Examiner* — Theodore Morris
*Attorney* — Fulwider, Patton, Rieber, Lee & Utecht

[57] ABSTRACT

A hydraulic composition for stabilizing soils comprising about 75 to about 95 parts by weight of a Component A and about 5 to about 25 parts by weight of a Component B. Component A comprises a calcined blend of 10–15 parts by weight of an alkaline earth metal chloride, 15–20 parts by weight of a vegetative or cellulosic material to produce carbon when component A is calcined, and 65–80 parts by weight of an alkaline earth metal hydroxide. component B comprises 5–90 parts by weight of Portland cement and 1–2 parts by weight of a lignin material derived from sulfite paper process waste, together with up to about 20 parts by weight of silica and/or up to about 60 parts by weight of an alkaline earth metal hydroxide such as slaked lime.

15 Claims, No Drawings

CALCINING ALKALINE EARTH METAL CHLORIDES WITH CELLULOSE AND ADMIXING WITH PORTLAND CEMENT

BACKGROUND OF THE INVENTION

This invention relates to earth control and, more particularly, to stabilizing or solidifying earth.

The stabilization and strengthening of soft ground is required for many reasons. Among these are the prevention of dust, the prevention of water passage through the soil, and the strengthening of soil for the purpose of supporting roads and buildings. Heretofore, cements such as Portland cement, have been employed for curing soil, i.e., for strengthening and stabilizing the soil. However, the disadvantage of using such cements is that they weather and crack relatively rapidly thereby reexposing the underlying soil. Some improvement is obtained by adding aggregate, such as sand and gravel to the cement. However, in order to obtain good results, the addition of the aggregate to the cement is complicated and expensive. If cost is reduced by employing simple mixing means, the results are unsatisfactory. The unsatisfactory performance of these cements leads to frequent repairing, thereby further increasing the costs of this method of stabilizing soil.

SUMMARY OF THE INVENTION

The hydraulic composition of this invention comprises 75 to 95 parts by weight of a component A and from 5–25 parts by weight of a component B. Component A comprises a calcined blend of from 10–15 parts by weight of an alkaline earth metal chloride, 15–20 parts by weight of a vegetative or cellulosic material to produce carbon when component A is calcined, and 65–80 parts by weight of an alkaline earth metal hydroxide. Component B comprises Portland cement and a lignin material derived from sulfite paper process waste, together with silica and/or an alkaline earth metal hydroxide such as slaked lime. The constituents of Component B are present in the following amounts: lignin waste material from the sulfite paper process—1 to 2 parts by weight; Portland cement—5 to 90 parts by weight depending upon the amounts of silica and alkaline earth metal hydroxides present; silica—up to about 20 parts by weight; and alkaline earth metal hydroxides—up to about 60 parts by weight.

The hydraulic composition of this invention is a fine particulate solid which is mixed with soil preferably at the work site. This mixture is then compressed and watered to produce the desired result. The ratio of this composition to soil depends upon the use to which the resulting mixture is to be put. For example, when forming the lower portion of a road bed, the ratio of this hydraulic composition to soil may be about 1 to 3 whereas when producing a pavement, the ratio may be about 1 to 1.

The advantages of this hydraulic composition over the presently employed cements are many. A primary advantage is its greater resistance to weathering and cracking which results in a substantially longer useful life than is obtainable by using presently employed cements. Additionally, this hydraulic composition substantially retains its initial shape and size after hardening whereas presently employed cements exhibit significant contraction from their poured volumes. Furthermore, the hydraulic composition-soil mixture cures or hardens in a substantially shorter time than is possible when using presently available cements. For example, soil mixed with the composition of this invention is sufficiently hardened after about 2 hours to permit pedestrian traffic thereover and is sufficiently hardened after about 48 hours to permit vehicular traffic thereon.

The foregoing and other advantages are obtained without the use of aggregate as required when employing presently available cements. Furthermore, use of the herein-described invention is inexpensive and fast since it merely requires turning up the soil at the operational site, mixing the hydraulic composition with the soil, pressing the mixed soil and hydraulic composition, and sprinkling water thereover. The mount of water need not be carefully measured and, thus, unskilled workmen may mix the hydraulic composition of this invention with soil.

DESCRIPTION OF THE PREFERRED EMBODIMENTS

The hydraulic composition of this invention is a fine particulate solid which can be mixed with soil at the operational site, compressed and watered to produce a firm, hard and durable surface. This hydraulic composition comprises about 75 to about 95 parts by weight of a Component A and about 5 to about 25 parts by weight of a Component B. In general, Component A comprises a calcined blend of 10–15 parts by weight of an alkaline earth metal chloride, 15–20 parts by weight of a vegetative or cellulosic material to produce carbon when component A is calcined, and 65–80 parts by weight of an alkaline earth metal hydroxide. In general, Component B comprises 5–90 parts by weight of Portland cement and 1–2 parts by weight of a lignin material derived from sulfite paper process waste, together with up to about 20 parts by weight of silica and/or up to about 60 parts by weight of an alkaline earth metal hydroxide such as slaked lime.

Component A will now be more specifically described. As the alkaline earth metal chloride of Component A, it is preferable to employ magnesium or calcium chloride because of their relatively low cost. Combinations of the alkaline earth metal chlorides may be employed as well as individual alkaline earth metal chlorides. For example, calcium and magnesium chloride may be employed in combination. The alkaline earth metal chlorides are employed in amounts between about 10 and about 15 parts by weight and are usually employed in aqueous slurry form when mixing the constituents of Component A. However, they may also be introduced into Component A in dry form.

The vegetative constituent of Component A includes, for example, wood pulp, sawdust, grass cuttings, and cotton. During the calcining of the Component A constituents, the vegetative constituent is reduced to carbon which, due to its source, serves to improve the characteristics of the composition of this invention. This constituent is employed in amounts between about 15 and about 20 parts by weight and is preferably employed in powder form.

The alkaline earth metal hydroxide constituent of Component A is preferably calcium hydroxide because of its low cost and availability. The amount of alkaline earth metal hydroxide varies between about 65 and about 80 parts by weight.

The constituents of Component A may be mixed in several ways. For example, they are normally mixed by first preparing an aqueous solution or slurry of the alkaline earth metal chloride and then mixing this slurry with the vegetative constituent and with the alkaline earth metal hydroxide in dry form. Preferably, this mixture is formed into granules after which it is calcined and pulverized to produce a fine particulate solid. Calcination takes place in the temperature range between about 500° C. and about 1,000° C. and, preferably, at a temperature of about 750° C. Temperatures above and below this temperature range are to be avoided since they produce a substantially different structure for Component A which adversely affects the improved characteristics of this invention.

The constituents of Component B will now be more specifically described. The alkaline earth metal hydroxide is preferably slaked lime (calcium hydroxide). This constituent is employed in amounts up to about 60 parts by weight and, preferably, in amounts between about 40 and about 60 parts by weight.

Silica may be employed as silica itself or in the form of silicic acid or inorganic silicates, e.g., sodium silicate. Combinations of these materials may be employed, e.g., sodium silicate and silicic acid. The silica is employed in amounts up to about 20 parts by weight and, is preferably employed in amounts between about 10 and about 20 parts by weight.

The lignin-containing material is obtained from the waste from the sulfite paper process and is primarily lignin calcium sulfonates. The lignin-containing material, as obtained from the waste of sulfite liquor, is wet and is dried to produce a powdered material. It is employed herein in amounts between about 1 to about 2 parts by weight (dry). Within this range, the lignin-containing material functions as an excellent binder. Below and above this range, inadequate binding is obtained.

The Portland cement is used in amounts of at least about 5 parts by weight and may be employed in amounts up to about 90 parts by weight, depending upon the amounts of silica and alkaline earth metal hydroxide which are also present. The amount of Portland cement normally employed varies between about 5 and about 40 parts by weight when both silica and alkaline earth metal hydroxide are present. If no alkaline earth metal hydroxide is present in Component B, the Portland cement is employed in amounts between about 70 and about 90 parts by weight. If the amount of silica employed in Component B is less than about 10 parts by weight, the amount of Portland cement, employed when using 10 parts by weight of silica is increased by the decrease in the amount of silica below 10 parts by weight.

When making up the composition of this invention, Component A is combined with all of the constituents of Component B except the Portland cement. The latter is added at the time the composition of this invention is to be used.

Component A is employed in amounts between about 75 and about 95 parts by weight to about 5 to about 25 parts by weight of Component B to thereby make 100 parts of the herein described composition. Below about 75 parts by weight of Component A, there is a rapid decrease in the rate of curing of the hydraulic composition-soil mixture and a substantial decrease in the durability or life of the stabilized product made with the composition of this invention. Above about 95 parts by weight of Component A, substantially no effective soil-curing action is exhibited by this hydraulic composition. Preferably, about 80 to about 90 parts by weight of Component A are employed with about 20 to about 10 parts by weight, respectively, of Component B.

The ratio of the composition of this invention to the soil with which it is mixed depends primarily upon the use to which the cured product is to be put. For example, when forming the lower section of a road bed for supporting concrete thereon, about 20 to about 40 parts by weight of the composition of this invention are combined with about 60 to about 80 parts by weight of the soil. To form a pavement, the hydraulic composition of this invention is employed in a ratio of about 1 to 1 with soil.

After Components A and B have been combined with the soil to be cured, the resulting mixture is spread, compacted and usually wetted. The amount of water added to the hydraulic composition-soil mixture depends upon the characteristics of the soil and upon the amount of water naturally present in the soil. In general, the amount of water added to the hydraulic composition-soil mixture is an amount which is equal to about 30 percent to about 40 percent by weight of the dry weight of the hydraulic composition-soil mixture. However, greater or lesser amounts of water may advantageously be present in the hydraulic composition-soil mixture. The amount of water employed is not critical and need not be carefully measured. By comparison, present Portland cement mixtures require relatively careful measurement of the water used in such mixtures.

The soils which the herein-described hydraulic composition is mixed include gravel, sand, silt, clays and organic soils containing a high percentage of organic matter. The size of the soil particles may be substantially smaller than can be employed in present cement concretes and may be 0.001 mm. and smaller.

Pouring of the herein-described hydraulic composition mixed with a soil may be done continuously without forming expansion joints, as required with prior cements, because of its very low expansion coefficient. Additionally, even when pouring is interrupted, e.g., at the end of a work day, pouring may be commenced without forming a joint both because of the aforementioned low expansion coefficient and because of the excellent adhesion of the herein-described composition.

The hydraulic composition of this invention will be further described by the following examples:

EXAMPLE 1

A hydraulic composition conforming to this invention was made up as follows. Ten parts by weight of magnesium chloride contained in an aqueous solution (35° Baumé) were mixed with 20 parts by weight of wood powder and 70 parts by weight of slaked lime. This mixture was formed into small spherical shapes and calcined at 700° C. plus or minus 100° C. for 30 minutes to 1 hour using a lateral rotary kiln. Thereafter, the calcined mixture was pulverized to obtain a fine particulate powder (Component A).

Separately, the following constituents were mixed: 50 parts by weight of nickel blast furnace slag; 10 parts by weight of a siliceous material containing 85 to 90 percent by weight of silica and 5 to 10 weight percent of alumina; 1 part by weight of lignin-containing sulfite process waste; 2 parts by weight of sodium silicate; and 37 parts by weight of Portland cement. This mixture was stirred to prepare a powdery composition of the Component B. Ninety parts by weight of Component A above were blended with 10 parts by weight of Component B to produce a hydraulic composition (I) of this invention.

The hydraulic composition I, Portland cement and Soliditit cement were each combined with Kanto loam and with Nagoya loam in the weight ratio shown in table 1 below. The Kanto and Nagoya loams were selected because each of these soils is relatively difficult to cure. The resulting mixtures were compressed, watered to the same extent, and cured under the same conditions to produce cylindrical test specimens 20 centimeters high and 10 centimeters in diameter.

Each cylinder was allowed to stand for 4 weeks. At the end of this time, each cylinder was subjected to a standard Japanese cement compression strength test (JIS R 5210). The results of these tests are set forth in table 1 below.

TABLE 1

| Curing agent | Soil | Ratio of soil to curing agent (part by wt.) | Compression strength (after 4 weeks (kg./cm.²) |
|---|---|---|---|
| Portland cement | Kanto loam | 70:30 | 20 |
|  | Nagoya loam | 70:30 | 40 |
| Soliditit cement | Kanto loam | 70:30 | 15 |
|  | Nagoya loam | 70:30 | 30 |
| The curing agent of the present invention. | Kanto loam | 70:30 | 40 |
|  | Nagoya loam | 70:30 | 60 |

From the compression test data of table 1 above, it is evident that the hydraulic composition of this invention is substantially superior to either of the presently employed Portland and Soliditit cements. This superiority exists for both the soils employed in the above test.

EXAMPLE 2

At a site containing Kanto loam, the soil was turned up and mixed with the hydraulic composition (I) of example 1 in the proportions of 70 parts by weight of soil and 30 parts by weight of hydraulic composition I. After the hydraulic composition I was substantially uniformly mixed with the soil, the surface of the mixture was rolled. Thereafter, water in amount of 50 parts by weight to 100 parts by weight of the combined soil and hydraulic composition I was sprinkled on the rolled surface and the mixture was left to stand.

After standing for 2 hours, the surface was sufficiently hardened as to be suitable for foot traffic and after standing for 48 hours, the surface was suitable for vehicular traffic.

After 1 week of standing, several samples of the mixture were taken and subjected to standard concrete compression and bending strength tests. The results of these tests were as follows: compression strength—35 to 40 kg./cm.$^2$; bending strength—28.1 to 32.4 kg./cm.$^2$.

EXAMPLE 3

The hydraulic composition I of example 1 was mixed with red clay in the ratio of 20 parts by weight of hydraulic composition I to 80 parts by weight of the red clay. Thereafter, the resulting mixture was rolled by a roller, sprinkled with water and left to harden.

After 1 week, several samples were taken from the cured mixture and subjected to the same compression and bending strength test as employed in example 2. The test data obtained was as follows: compression strength—174 to 150 kg./cm.$^2$; bending strength—36.2 kg./cm.$^2$.

EXAMPLE 4

This example illustrates the effective use of the composition of this invention with a high organic content soil having a small (colloidal) particle size.

Example 3 was repeated except that hedoro soil (a clay soil having a high organic and water content with the soil in colloidal dispersion in the water) was substituted for the red soil of example 3. After 1 week, the compression strength of the cured mixture was 90.3 to 97.3 kilograms per square centimeter. By comparison, standard cements, e.g., Portland cement, cannot be satisfactorily employed with hedoro soil.

EXAMPLE 5

About 80 parts by weight of soil were mixed with 20 parts by weight of the hydraulic composition I of example 1 and the mixture was treated as described in example 3 to produce a lower road bed section 10 centimeters thick by 6 meters wide by 50 meters long. A 5 centimeter thick layer of asphalt mixed with pebbles was spread over this lower road bed section after it had cured to produce an excellent pavement.

This pavement was subjected to a high traffic volume, including heavy vehicles. However, no substantial damage to the pavement was produced even after a long period of time (about 36 months).

EXAMPLE 6

About 70 parts by weight of red clay were mixed with pebbles and this mixture was added to 30 parts by weight of the hydraulic composition of example 1. The resulting mixture was treated as described in example 3. The compression strength carried out as described in example 3 after 1 week was 174 kg./cm.$^2$ and no collapsing of the cured surface occurred after 3 years of testing.

EXAMPLE 7

This example illustrates the use of varying amounts of the hydraulic composition of this invention in combination with a particular soil composition. It further provides a comparison between the composition of this invention and Portland cement when both are used with this same soil composition.

The hydraulic composition described in example 1 was employed in this example. The soil with which the composition of this invention and the Portland cement were mixed was identified as follows:

solids composition—granular gravel—45 percent by weight, sand—33 percent by weight, silt—15.9 percent by weight, clay—6 percent by weight;

natural moisture content—7.83 percent by weight of solids; and density—2.696 gm./cc.

The above-described composition of this invention was mixed with this soil in amounts of 5 parts, 10 parts, 15 parts and 20 parts by weight per 100 parts by weight of the above-identified soil. Water in amounts between about 14.5 percent and about 16 percent by weight per weight (dry) of soil was added to the resulting mixtures which were then compacted and allowed to set.

After 7 days, a core of each of the cured mixes was taken. Uniaxial compression tests were conducted on each core. The results are shown in table 2 below:

TABLE 2

| Composition I (parts/100 parts of soil) | Uniaxial Compression Strength After 7 days (kg./cm.$^2$) |
|---|---|
| 5 | 16.6 |
| 10 | 28.5 |
| 15 | 38.5 |
| 20 | 46.1 |

These data show that effective soil stabilization is provided by even relatively small amounts (5 percent) of the composition of this invention. Additionally, these data show tnat substantial curing occurs in a relatively short time (7 days) when using the herein-described hydraulic composition in combination with a soil and water. These data are particularly impressive because the herein-employed soil is a relatively "muddy" soil (21.9 percent silt and clay) which is normally very difficult to stabilize as is shown by the following comparative test.

To provide a comparison test, 12 parts by weight of each of Portland cement and composition I were separately mixed with 100 parts by weight of the above-described soil. Effective amounts of water were added to each of the resulting mixtures which were then compacted in like manner and allowed to set. Uniaxial compression tests were conducted as described above over a period of 180 days. The results are shown in table 3 below:

TABLE 3

| | Compression Strength (kg./cm.$^2$) | | | |
|---|---|---|---|---|
| Time (days) | 1 | 3 | 15 | 180 |
| Composition I + Soil | 24 | 36 | 60 | 70 |
| Portland cement + Soil | 17 | 25 | 27 | 28 |

As will be seen from table 3, the hydraulic composition of this invention stabilizes soil much faster than does a presently available cement. Additionally, it produces a substantially stronger composition (70 kg./cm.$^2$) in combination with a soil than does Portland cement (28 kg./cm.$^2$).

I claim:

1. A method for producing a hydraulic composition for setting soils, comprising:

calcining an admixture consisting of an alkaline earth metal chloride selected from the group consisting of $MgCl_2$, $CaCl_2$ and mixtures thereof in amount between about 10 parts to about 15 parts by weight, a cellulose-containing material selected from the group consisting of wood pulp, sawdust, grass cuttings and cotton in amount between about 15 parts to about 20 parts by weight, an alkaline earth metal hydroxide in amount between about 65 parts to about 80 parts by weight, at a temperature between about 500° C. and about 1,000° C. to produce a Component A;

admixing with said Component A a Component B comprising:

Portland cement in amount between about 5 parts to about 90 parts by weight, lignin calcium sulfonate in amount between about 1 part to about 2 parts by weight, silica in amount up to about 20 parts by weight, and an alkaline earth metal hydroxide in amount up to about 60 parts by weight, said Component A being present in amount between about 75 parts and about 95 parts by weight and said Component B being present in amount sufficient to make 100 parts by weight of said hydraulic composition.

2. The method of claim 1 wherein said cellulose-containing material is one of the group of wood pulp, sawdust, grass cuttings and cotton.

3. The method of claim 1 wherein said silica is present in amount between about 10 parts and about 20 parts by weight.

4. The method of claim 3 wherein said alkaline earth metal hydroxide in Component B is present in amount between about 40 parts and about 60 parts by weight.

5. The method of claim 3 wherein said Portland cement is present in amount between about 70 parts and about 90 parts by weight and the amount of said alkaline earth metal hydroxide in Component B is zero.

6. The method of claim 4 wherein said Portland cement is present in amount between about 5 parts and about 40 parts by weight.

7. The method of claim 1 wherein said Component A is present in said hydraulic composition in amount between about 80 parts and about 90 parts by weight.

8. The method of claim 1 including the further steps of:
admixing said hydraulic composition with a moisture-containing soil; and
compacting said soil-hydraulic composition admixture, whereby said soil-hydraulic composition admixture hardens upon standing.

9. The method of claim 8 wherein water is added to said soil-hydraulic composition admixture in amount sufficient to produce hardening of said admixture.

10. The method of claim 9 wherein said amount of water is sufficient to provide said admixture with a water content between about 30 percent and about 40 percent of the dry weight of said soil-hydraulic composition admixture.

11. The method of claim 8 wherein the ratio of said hydraulic composition to said soil is between about 1:3 and about 1:1.

12. The hydraulic composition made according to the method of claim 1.

13. The hydraulic composition made according to the method of claim 7.

14. A method of producing a hydraulic composition for setting soils, comprising:
calcining an admixture consisting of
an alkaline earth metal chloride selected from the group consisting of $MgCl_2$, $CaCl_2$ and mixtures thereof, in amount between about 10 parts to about 15 parts by weight,
a cellulose-containing material selected from the group consisting of wood pulp, sawdust, grass cuttings and cotton, in amount between about 15 parts to about 20 parts by weight,
an alkaline earth metal hydroxide in amount between about 65 parts to about 80 parts by weight, at a temperature between about 500° C. and about 1,000° C. to produce a Component A;
admixing with said Component A a Component B comprising:
Portland cement in amount between about 5 parts to about 90 parts by weight,
lignin calcium sulfonate in amount between about 1 part to about 2 parts by weight,
silica in amount between about 10 parts and about 20 parts by weight,
and an alkaline earth metal hydroxide in amount between 40 parts and about 60 parts by weight,
said Component A being present in amount between about 75 parts and about 95 parts by weight and said Component B being present in amount sufficient to make 100 parts by weight of said hydraulic composition.

15. The method of claim 14 including the further steps of:
admixing said hydraulic composition with a soil;
wetting said hydraulic composition-soil admixture with water in amount sufficient to provide said admixture with a water content between about 30 percent and about 40 percent by weight of the dry weight of said admixture;
and compacting said wetted hydraulic composition-soil admixture, whereby said admixture hardens upon standing.

* * * * *